ELECTRONIC MEMORY DEVICE

Filed May 19, 1949 4 Sheets-Sheet 1

INVENTOR.
JOHN T. POTTER
BY

Moses, Nolte, Crews & Berry
ATTORNEYS

Sept. 1, 1953 J. T. POTTER 2,650,830

ELECTRONIC MEMORY DEVICE

Filed May 19, 1949 4 Sheets-Sheet 2

INVENTOR.
JOHN T. POTTER
BY
Moses, Nolte, Crews + Berry
ATTORNEYS

Sept. 1, 1953 J. T. POTTER 2,650,830

ELECTRONIC MEMORY DEVICE

Filed May 19, 1949 4 Sheets-Sheet 3

INVENTOR.
JOHN T. POTTER
BY
Moses, Nolte, Crews & Berry
ATTORNEYS

ELECTRONIC MEMORY DEVICE

INVENTOR.
JOHN T. POTTER
BY
Moses, Nolte, Crews & Berry
ATTORNEYS

Patented Sept. 1, 1953 2,650,830

UNITED STATES PATENT OFFICE 2,650,830

ELECTRONIC MEMORY DEVICE

John T. Potter, Great Neck, N. Y.

Application May 19, 1949, Serial No. 94,140

2 Claims. (Cl. 274—4)

The present invention is concerned with cataloging or filing devices and, in particular, with what may be designated as a three dimensional electronic memory device.

The present application is a continuation-in-part of my application entitled "Three Dimensional Selector and Memory Device," filed on September 1, 1948, and bearing Serial No. 47,292, now Patent No. 2,620,389, issued December 2, 1952.

The filing and cataloging of a wide range of information is a complex and growing problem. A simple file consists in the indexing of a relatively small amount of information under a few significant titles. A few dozen subjects may be handled in this way, and when any particular information is desired, it may be extracted manually. Files set up according to this simple system are cumbersome and space consuming.

Information may be somewhat condensed by the use of card files. Further condensation may be accomplished by photographic film. These methods save space but the derivation of information from such files is still time consuming.

Punched card systems have been devised which are particularly useful where analysis or sorting of information into various classifications is important.

There is still a large and growing need for a catalog or file system which will hold a large number of facts and especially one which will yield desired facts quickly. The present invention has to do with a system and devices for storing a large number of facts, any one of which may be practically instantaneously selected and reproduced.

In its preferred form the present invention consists in a large number of steel wires or other magnetizable sound tracks carrying information recorded directly or in the form of coded pulses. These tracks are disposed in rows and columns in which, for instance, 10,000 tracks are contained in 100 rows, each row comprising 100 tracks. A two dimensional selecting system permits practically instantaneous selection of any one of the 10,000 tracks. Once selected, the desired information is derived by a third dimensional motion for reproducing or picking off the information from the track. The entire process of selecting any wire, reproducing the information and restoring the device to its initial condition may be accomplished very expeditiously.

One object of the present invention is to provide a method of and means for storing and rapidly selecting and reproducing a large amount of information.

Another object is to provide a method of and means for storing a great number of quickly derivable facts in a small space.

Still another object is to provide a method of and means for storing a large number of facts which may be practically instantaneously selected by means of a simple code as by means of two numbers from 0 to 99 and a selecting mechanism.

An additional object is to store information in a two dimensional system or device.

A further object is to store a large number of facts in a two dimensional system and to utilize a third dimension to derive or reproduce any of the desired facts.

These and other objects will be apparent from the detailed description of certain illustrative embodiments of the invention given in connection with the various figures of the drawing.

In the drawing forming part of this specification:

Figure 1:
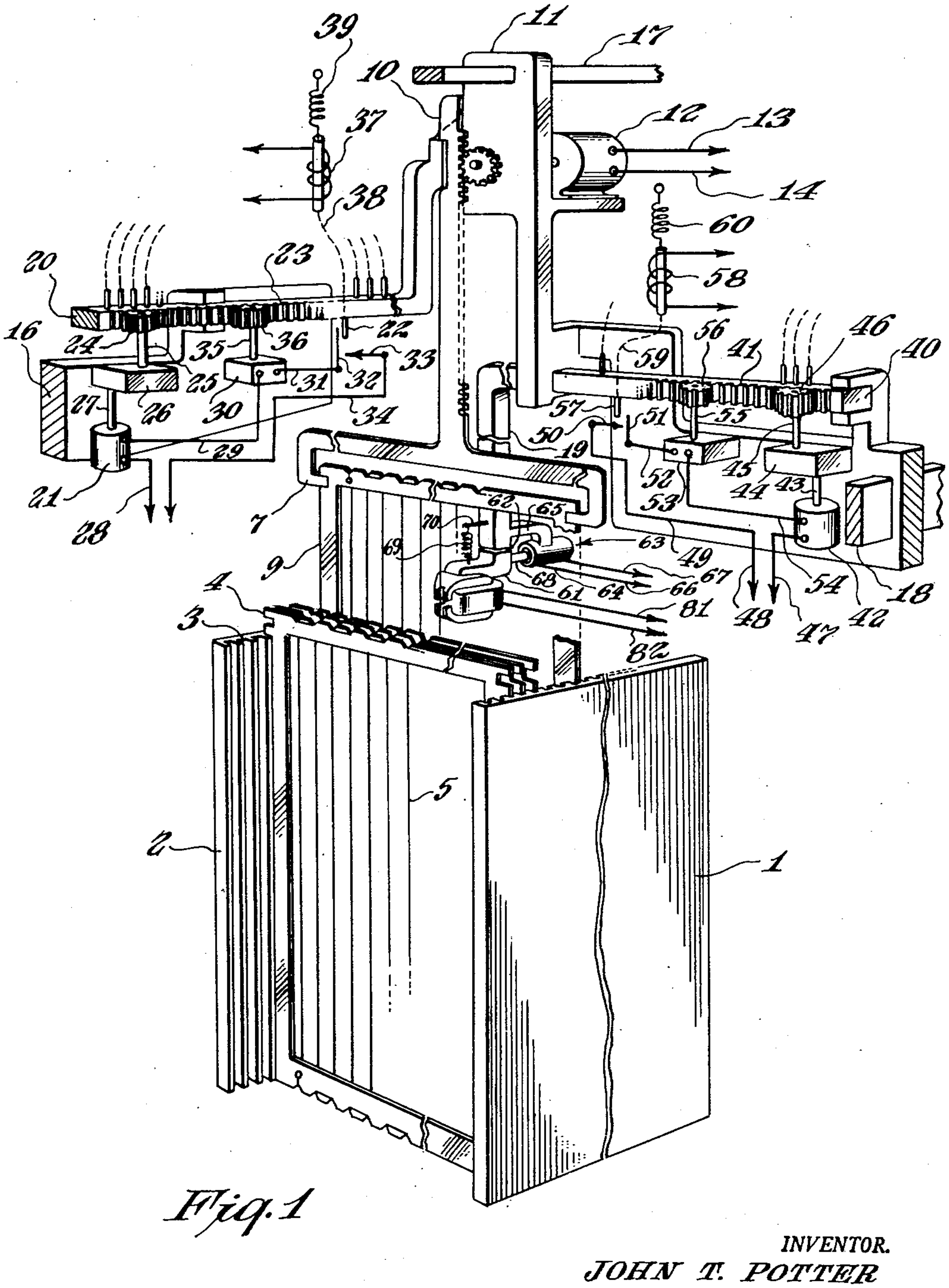
Fig. 1 is a fragmentary perspective view of a practical and advantageous, illustrative structure embodying features of the invention, parts being broken away intermediate their ends in many instances for compactness of illustration.

In the illustrative apparatus of Figs. 1 to 5 a file case or magazine is provided comprising upright, parallel plates 1 and 2. The plates 1 and 2 are formed with vertically extending grooves for holding a large number of record frames 4. The frames or records 4 are free to slide up and down in the grooves 3. Each frame 4 is of open rectangular construction and is strung with a large number of parallel, vertically extending, magnetizable wires 5 which constitute sound tracks. In a typical case the plates 1 and 2 would be provided with grooves for supporting one hundred record frames 4, and each record frame 4 would include one hundred of the vertical wires 5.

Each frame 4 is provided at opposite sides of its upper end with notches 6. All of the notches at one side of the plates stand in horizontal alignment with one another when the plates are in their normal positions.

A bail member 7, which serves as a record operator, is carried by a rack 10, and is adapted to be adjusted along with a magnetic pick-up 8 into position for cooperation with a particular frame. During such adjustment the pick-up 8 travels above all the frames, while inturned fingers of the bail 7 travel along the notches of the frames 4 until they are brought to rest in the notches of a selected frame. The pickup device 8 is then adjusted transversely of the frame to bring it substantially into vertical alignment with a selected wire of the frame, after which the bail is lifted by a rack 10 to carry the selected wire upward past the pick-up head 8. When the bail 7 has reached the upper limit of its movement, it is automatically returned to its lower position, with the inturned fingers in line with the notches 6 of all the frames. As the frame is raised, the information magnetically recorded upon the selected wire is transferred by the pick-up 8 through conductors 81 and 82 to any suitable utilization means, such as a loudspeaker, or mechanism adapted to be operated by code impulses.

The rack 10 with the bail 7 is mounted for vertical sliding movement in a main carriage 11. The rack is driven through a pinion 15 from a reversible motor 12, mounted on the carriage 11, the motor being supplied with current from conductors 13 and 14. The main carriage 11 is mounted to slide horizontally in a fore and aft direction upon supporting members 16, 17 and 18, which form parts of the stationary main framework of the machine. Operation of the main carriage 11 along the guides 16, 17 and 18 carries the bail 7 into position to select a desired frame.

The main carriage, as it is so adjusted, carries with it a sub-carriage 19 upon which the pick-up head 8 is mounted. The sub-carriage travels in unison with the main carriage, and hence the pick-up head is moved into position to cooperate with a selected frame simultaneously with the movement of the bail into position to raise the selected frame. The frame member 9 is shown in a partly raised position in Fig. 1.

As has been indicated above, the mechanism shown in Fig. 1 permits selection of any one of the frames 4, and the selection of any wire 5 on the selected frame. In order to select a predetermined frame, a rack bar 20 which extends in a fore and aft direction and constitutes a unitary part of the main carriage 11 is moved to a selected position by means of a motor 21, and is stopped at the selected position by suitable motor controlling and braking mechanism controlled through one of a multiplicity of settable pins 22.

One side of the bar 20 is provided with rack teeth 23, and the motor drives the bar by means of a pinion 24 coupled to the motor 21 through a shaft 25, a gear box 26 and a shaft 27. The motor 21 is energized over a line conductor 28 and over a conductor 29. The conductor 29 is connected through a brake box 30, a conductor 31, a switch member 32, and a contact 33 with a line conductor 34. A brake mechanism is provided in brake box 30 which applies braking force to the bar 20 through the shaft 35 and a pinion 36 whenever the motor power circuit is opened. When the set pin 22 engages the switch member 32, it opens the switch 32—33, deenergizing the motor 21 and applying the brake (to be described in detail) to bring the main carriage quickly to rest.

The set pin 22 is one of a series of equally spaced pins carried by the arm 20. Each of these pins corresponds to a position of one of the frames 4. Any one of the pins may be pushed down to the position shown for the pin marked 22 by an associated solenoid 37 carried on the main frame. Each solenoid 37 is connected through a push wire 38 to the associated pin 22, and is operative when the solenoid is energized to thrust the pin downward into set position and hold it there. The armature of each solenoid is connected to a return spring 39 by which it is pulled upward to restore the pin 22 to normal position when the energizing current is cut off.

Such movement of the main carriage, as has already been pointed out, carries the sub-carriage 19 with it. The sub-carriage 19 is mounted in the main carriage 11 for transverse sliding movement. Such transverse movement of the sub-carriage may follow or precede or be simultaneous with the movement of the main carriage. The purpose of moving the sub-carriage is to locate the pick-up head 8 just above a selected wire 5. In other words, the main carriage selects the row or frame and the sub-carriage selects the column.

The sub-carriage 19 includes a rack bar 40, which is provided with rack teeth 41. A motor 42 is connected through a shaft 43, a gear box 44, a shaft 45, and a pinion 46 to drive the rack bar 40. Power for the motor is supplied directly from a first line conductor 47 and from a line conductor 48 through a conductor 49, a contact 50, a movable switch member 51, a conductor 52, a brake box 53, and a conductor 54. The brake box 53 contains a brake which operates when power to the motor 42 in interrupted, as by the opening of switch 50—51. The brake applies braking force to the arm 40 through a shaft 55 and a pinion 56.

The arm 40 is provided with a series of settable pins 57 which are similar in all respects to the pins 22 of the arm 20. Each of the pins 57 corresponds in position to one of the frame wires, so that when a frame has been selected, it is possible to select any one of the wires on the frame. Each pin is provided with an actuating solenoid 58 which is connected to the pin through a push wire 59. A restoring spring 60 is provided for each solenoid armature to return the armature and the connected pin 57 to normal position when the solenoid is deenergized.

When a solenoid 58 is energized, its corresponding pin 57 is pushed down for cooperating with the switch member 51. When the switch member 51 is moved to the open position by the set pin 57, the motor 42 is deenergized and the brake contained in the brake box 53 is applied to bring the arm 40 to a quick stop.

The pick-up 8 is carried by a support 61, which is connected through a hinge 62 to the sub-carriage 19. During the selecting operations of the main carriage and the sub-carriage the pick-up is held back by a solenoid 63. The winding 64 of the solenoid is carried by a rigid extension arm 65 of the sub-carriage 19 and is supplied with current over conductors 66 and 67. The armature 68 of the solenoid 63 extends rearwardly from the pick-up support 61 into the interior of the coil 64. A spring 69 connected to the support 61 and to a pin 70 carried by the sub-carriage 19 tends to swing the pick-up upward and forward into position to embrace one of the wires 5.

As the selected frame starts upward, the pick-up is held back to clear the bail 7 and the upper margin of the frame. As soon as the upper margin of the frame has passed above the pick-up head, however, a switch in circuit with the coil 63 is automatically opened, and the pick-up is swung by the spring into position to embrace the selected wire.

The motor 12 is not set into operation to raise the bail 7 until the operations of the carriage and the sub-carriage to select the frame and the wire have been completed. When the frame has been drawn upward to a fully extended position and has been returned to its normal position, the carriage and sub-carriage may be restored to normal in preparation for a new selection and a new cycle of operations.

Figures 2, 3:
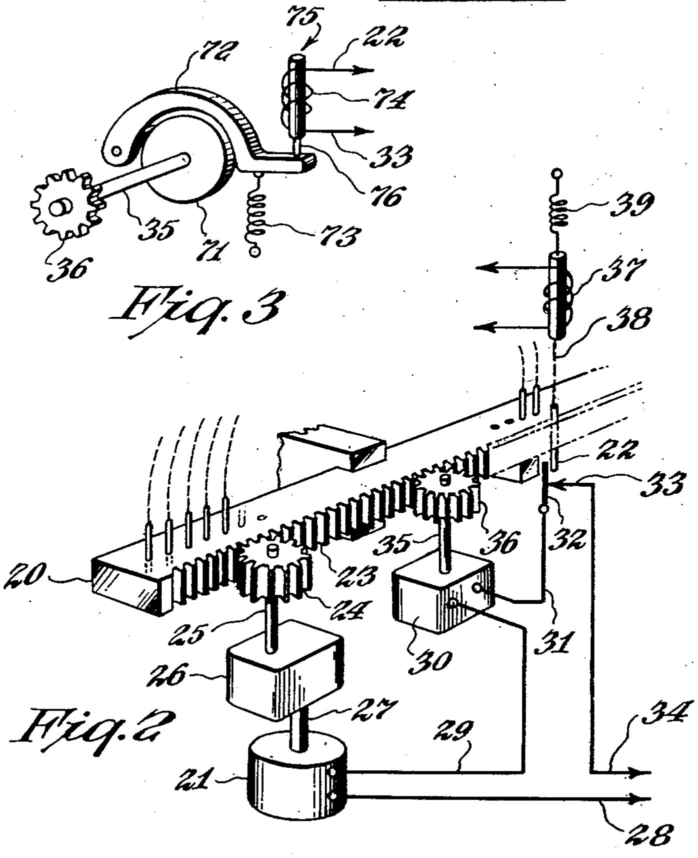
Fig. 2 is a fragmentary perspective view on a larger scale than Fig. 1 showing a portion of the mechanism of Fig. 1.
Fig. 3 is a detail view showing a portion of the mechanism of Fig. 1.

In Fig. 3 the structure of the mechanism enclosed in the brake box 30 is illustrated. The shaft 35, which carries the pinion 36, has fast upon it a brake drum 71. A brake shoe 72 is pulled toward the brake drum by a spring 73 for applying braking force to the drum and through the shaft 35 and pinion 36 to the arm 20. Whenever the motor 21 is energized current is passed through the winding 74 of a solenoid 75, the winding being interposed between the conductors 31 and 29 of the motor operating circuit. The solenoid armature 76 is connected to the brake shoe 72 and acts to hold the shoe 72 out of contact with the brake drum 71 whenever the winding 74 is energized. When the motor current is interrupted by the action of a set pin 22 upon switch member 32, the solenoid 75 is deenergized and the brake is made effective by the spring to bring the brake drum 71 quickly to rest. Since there is no lost motion between the brake drum and the bar 20, the bar 20 is also brought quickly to rest.

Figure 4:
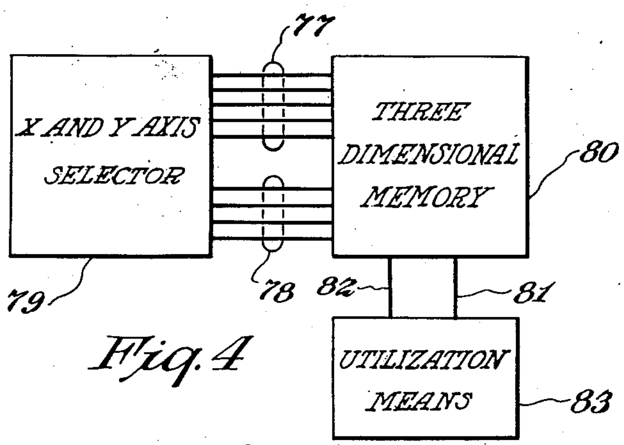
Fig. 4 shows a complete three dimensional memory system in block diagram.

Fig. 4 shows in block diagram a typical system utilizing the three dimensional memory of the present invention. The X and Y axis selector 29, to be described in detail below, is connected to the three dimensional memory 80 by means of leads 77—78. The three dimensional memory 80 is essentially the device shown in Fig. 1 or that shown in Fig. 7. The output of memory 80, which is the output of pick-up 8 of Fig. 1, is connected to any suitable utilization means 83 by means of leads 81—82. Utilization means 83 may be any suitable device for making use of the information derived from the recording contained in the memory 80.

Figure 5:
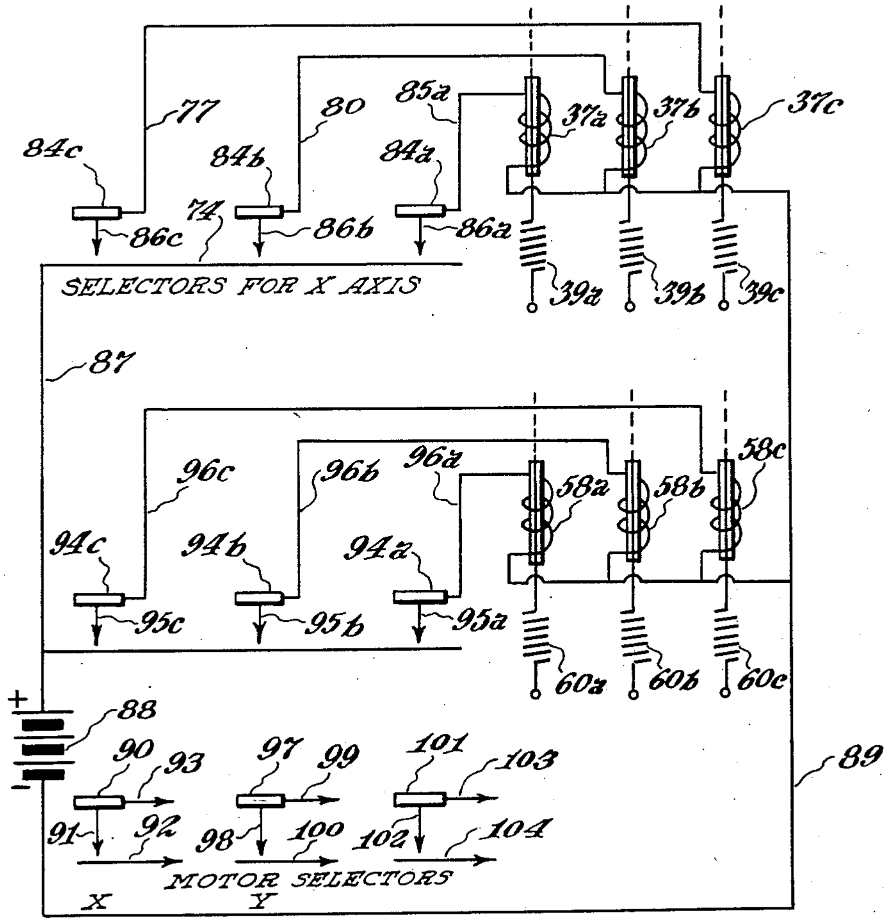
Fig. 5 is a diagram of a typical selector and motor control.

Fig. 5 shows a portion of the circuit of a typical selector such as 79 of Fig. 4. Solenoids 37*a*, 37*b* and 37*c* represent a portion of the X axis solenoids along arm 20 of Fig. 1. Return springs 39*a*, 39*b* and 39*c* are provided for the armatures of these solenoids respectively to restore their corresponding pins after selection has been made. A key 84*a* is connected to solenoid 37*a* over a lead 85*a* and serves to close a circuit through a contact 86*a* which includes a conductor 87, a suitable source of electrical energy such as a battery 88, and a conductor 89. Similar keys 84*b* and 84*c* controlling contacts 86*b* and 86*c* energize solenoids 37*b* and 37*c* respectively, the conductors 87 and 89 and the battery 88 being common to the several energizing circuits.

While only three solenoids and three keys have been shown, a complete device will actually include a great number of solenoids and keys, one for each of the desired positions in the X direction. Pushing one of the keys actuates the corresponding solenoid and its associated stop pin. The selection in the X direction is completed by operating the X direction motor (motor 21 of Fig. 1) by means of a key 90 which closes contact 91 and thereby completes a motor energizing circuit between conductors 92 and 93.

Keys 94*a*, 94*b* and 94*c* control solenoids 58*a*, 58*b* and 58*c* through contacts 95*a*, 95*b* and 95*c* over conductors 96*a*, 96*b* and 96*c*. Each key is adapted to connect the associated solenoid in circuit with the conductors 87 and 89 and the battery 88. The solenoids are provided with return springs 60*a*, 60*b* and 60*c* respectively. The keys 94*a*, 94*b* and 94*c* control the Y direction selection; that is to say, the selection of the pin on the arm 40 which is to be set in an effective position. When a given position has been selected by operating one of the Y axis keys, the Y direction motor 42 is energized by pressing key 97 to close contact 98 and thereby establish the operating circuit of the motor 42 through conductors 99 and 100.

As illustrated each X axis selecting key would be held down until the motor 21 has been operated to carry the main carriage to the selected position by the closing of the contact 91, after which the X axis selecting key and the key 90 would be released. Similarly, the Y axis selecting key is held down until the motor 42 has been operated by closing of the contact 98 to carry the sub-carriage 19 to the selected position, after which the Y axis selecting key and the key 97 can be released.

When the coordinate selectors for the X and Y directions have been operated and the carriage and sub-carriage have been operated in accordance with the selections effected, the pick-up 8 of Fig. 1 is substantially in line with a predetermined wire on a predetermined frame. At this point key 101 is operated to close contact 102 for completing the operating circuit of motor 12 through conductors 103 and 104.

When the motor 12 is thus energized it acts to raise the bail 7 and so to move upward at regulated speed the arm which is engaged by the inturned fingers of the bail. This causes the wire or sound track 5 which has been selected to be be moved lengthwise past the pick-up, so that the magnetic recording is caused to generate electrical impulses in the pick-up representing the information recorded in the sound track.

When the desired information has been conveyed by the pick-up 8 to the utilization means, the bail 7 is returned to its lower position to restore the selected frame to normal position. This restoration may be effected by causing the motor 12 automatically to reverse at the upward limit of movement of the bail 7 and automatically to come to rest at the conclusion of the downward movement of the bail 7.

The main carriage 11 and the sub-carriage 19 may be returned to normal position in any suitable manner, either by manual operation, or by providing reversing connections and reversing switches for the motors 41 and 42 together with limit stops for interrupting the motors and arresting the carriages when the restoration to normal has been effected.

Figure 6:
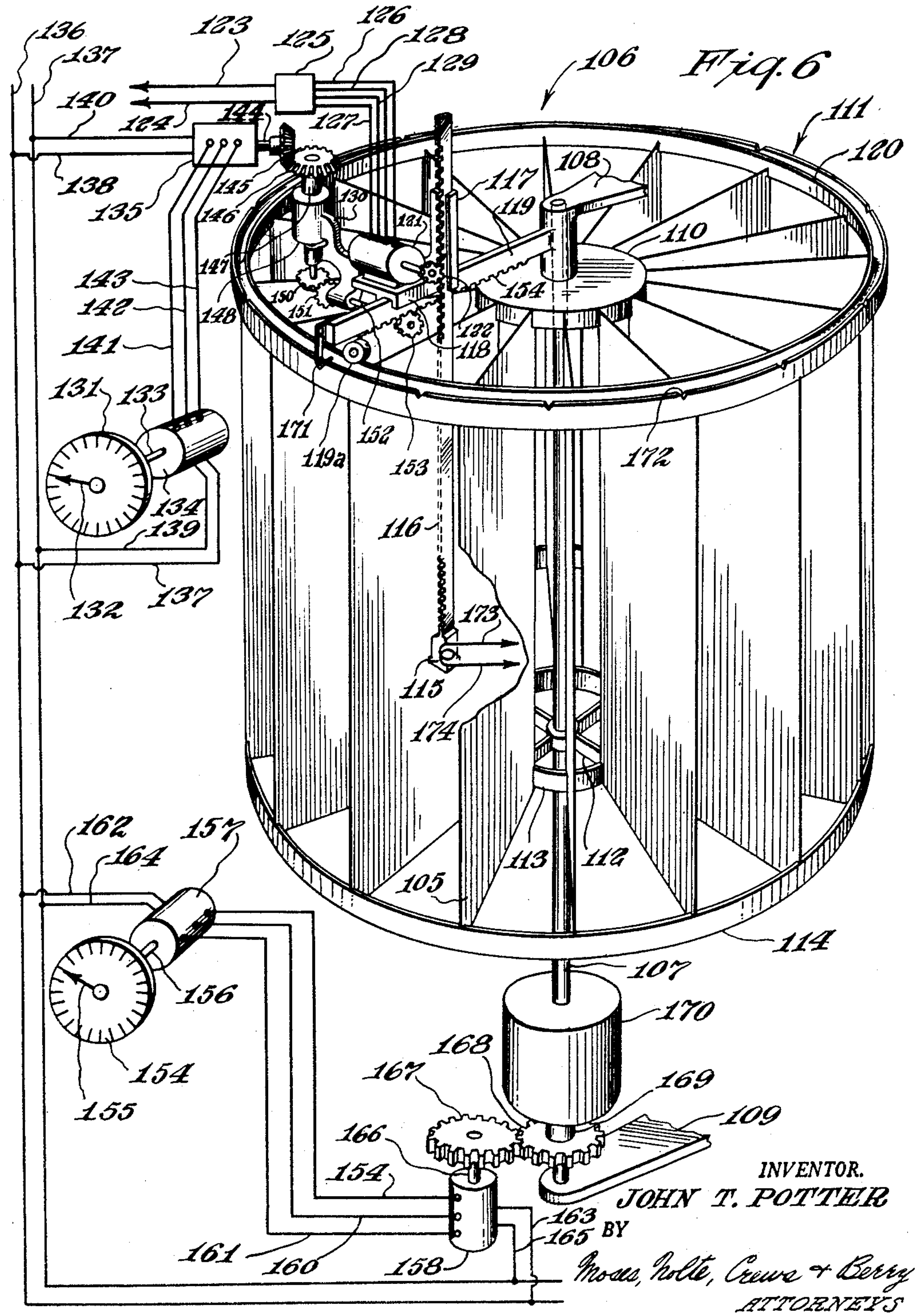
Fig. 6 is a fragmentary perspective view showing another form of mechanism embodying features of the present invention.

In Fig. 6 disclosure is made of another form of mechanism embodying the invention. In this form of the invention each record consists of a thin steel sheet 105 having a large number of parallel sound tracks along which recordings are made. The sound tracks on the sheets extend along parallel, vertical lines. The sheets, which are desirably flat, are mounted radially in a rotary cylindrical magazine 106. The magazine comprises a central supporting shaft 107 which is rotatably mounted in upper and lower stationary brackets 108 and 109.

The shaft 107 has affixed to its upper end a disc 110 which is connected to an outer ring 111 through the record sheets 105. The shaft also has fast upon it a spider 112 which is connected to a lower inner ring 113. The inner ring 113 is connected through the lower ends of the records 105 to a lower outer ring 114.

A pick-up 115 stands normally in a position to clear the upper ends of the record plates 105 but is small enough to be operated vertically downward between two of the records and in proximity to one of them when a desired record, and a desired sound track on the record, have been selected. Selection of the record is made by rotation of the magazine 106. Selection of the sound track on the record is made by radial adjustment of the pick-up 115. Reproduction of the selected record is effected by operation of the pick-up downward along the selected sound track.

The pick-up 115 is carried by a rack 116 which is guided for vertical movement in a channeled extension 117 of a motor carriage 118. The motor carriage 118 is slidably mounted upon a radially extending rack 119 which is carried in fixed position by the bracket 108. The rack 119 at its outer end carries a wheel 119*a* which rests upon a flange or track 120 of the upper outer ring 111 of the magazine 106.

A reversible motor 121, mounted upon the carriage 118, drives the rack 116 through a pinion 122. Power is supplied to the motor 121 over conductors 123 and 124, through a reversing switch 125, the reversing switch being connected to the motor armature and field over conductors 126, 127, 128 and 129. Reversing switch 125 serves to control the motion upward or downward of the pick-up 150.

The motor carriage 118 also includes a bracket 130 which carries mechanism for driving the carriage toward and from the shaft 107. A stationary sound track indicating dial 131 is provided for cooperating with a manually settable pointer 132. The pointer 132 is mounted upon the shaft 133 of a Selsyn motor 134 which constitutes the transmitter of a pair of such motors, the receiving motor being designated 135. Remote control systems employing Selsyn motors are well understood, so that no detailed description is considered necessary. One line conductor 136 is connected to the motors 134 and 135 through conductors 137 and 138, while the other line conductor 137 is connected to the respective motors 134 and 135 through conductors 139 and 140. The motors 134 and 135 are connected to one another through three wires 141, 142 and 143.

It is characteristic of the Selsyn combination that the output shaft 144 of the receiver motor 135 is caused at all times to correspond in position with the input shaft 133 of the sender motor 134. The motion of the shaft 144 is transmitted through a pair of beveled gears 145 and 146 to a sleeve 147. The sleeve 147, through a follow-up torque amplifier 148, causes the amplifier output shaft 149 to correspond at all times to the position of the shaft 144 and hence to the position of the pointer 132.

The gearing employed from the shaft 144 to the sleeve 147 may be multiplying gearing, in which case the sleeve 147 and the shaft 149 will turn more rapidly than the shafts 143 and 144. There will always, however, be a proportionality of operation and a correspondence of position. The gearing is so chosen that the carriage 118 is caused to traverse its entire operating range in response to a movement of the pointer 132 through its complete operating range.

The shaft 149 has fast upon it a beveled pinion 150 which, through a beveled pinion 151 and a shaft 152, drives a pinion 153 which is in mesh with teeth 154 of the rack 119. Operation of the pointer 132 in either direction to a desired setting produces simultaneous operation of the carriage 118 in a corresponding direction and to a corresponding position. With this control mechanism no resetting of the carriage is required because it can be directly operated from any position in which it is left standing to the new selected position. Because the output is linear, not rotary, however, the selector cannot be operated directly from 99 to 00 in a forward direction.

The selection of a record 105 by rotation of the magazine 106 is controlled by mechanism precisely similar to that described for controlling the carriage 118. A stationary record indicating dial 154 is provided for cooperating with a manually operated pointer 155. The pointer is fast on the input shaft 156 of a Selsyn motor 157 which constitutes the sender. The sender motor 157 is connected to the receiving motor 158 through wires 159, 160 and 161. Line conductor 136 is connected to the motors 157 and 158 through conductors 162 and 163 respectively. Line conductor 137 is connected to the motors 157 and 158 through conductors 164 and 165, respectively. The output shaft 166 of receiver motor 158 is connected through pinions 167 and 168 to drive the sleeve 169 which is revolubly mounted on the shaft 107. The sleeve 169 is connected through a torque amplifying follow-up mechanism 170, to cause the shaft 107 to be driven in unison with itself. Since the pointer 155 could have a range of movement of 360° and the magazine 106 desirably has a range of movement of 360°, the ratio of gears 167 and 168 is in this instance desirably a one-to-one ratio.

As in the case of the carriage 118 the magazine can be operated from any position in which it is left to a new selected position. Because the magazine is a rotary member it does not have to operate between limits and hence can have unlimited rotation in either direction. Thus the pointer 155 can always be moved from the last setting to the next desired setting through the shortest possible course, even though such movement carries the pointer through the zero position.

A spring detent 171 is provided on the outer end of the rack 119 for cooperating with detaining notches 172 of the ring 11, to precisely determine the arrested position of the magazine 106 during the travel of the pick-up along the selected record track. The output of the pick-up 115 is carried to any suitable utilization means such as a loudspeaker over conductors 173 and 174.

I have described what I believe to be the best embodiments of my invention. I do not wish, however, to be confined to the embodiments shown, but when I desire to cover by Letters Patent is set forth in the appended claims.

I claim:

1. An information storing, selecting and reproducing system comprising, in combination, a large number of retangular records each having a plurality of parallel magnetizable sound tracks upon it, a record magazine supporting the records in closely packed formation and in similar attitudes so that the sound tracks are disposed in rows and columns, a magnetic pick-up for cooperating with any one of the sound tracks selected, a pair of coordinate selectors operable respectively to select the row and the column of a particular sound track, pins settable by the respective selectors, power mechanism for relatively shifting the pick-up and the magazine to select record track row under the control of the stop pin set by the first selector, power mechanism for relatively shifting the pick-up and the magazine to select the record track column under the control of the stop pin set by the second selector, and mechanism for relatively shifting the pick-up and the selected sound track lengthwise of the latter to utilize the information recorded in the selected sound track.

2. An information storing, selecting and reproducing system comprising, in combination, a cylindrical record magazine, a large number of parallel magnetizable record sound tracks disposed in circular columns and radiating rows in said magazine, a magnetic pick-up cooperative with any one of the sound tracks selected, a manually operable row selector, mechanism responsive thereto comprising a remote control transmission and torque amplifying follow-up mechanism for relatively shifting the magazine and the pick-up to a predetermined relation according to the row selected, a manually operable column selector, mechanism responsive thereto comprising a remote control transmission and torque amplifying follow-up mechanism for relatively shifting the magazine and the pick-up to a predetermined relation according to the column selected, and mechanism for relatively shifting the pick-up and the selected sound track, lengthwise of the sound track to utilize the information recorded in the selected sound track.

JOHN T. POTTER.

References Cited in the file of this patent

UNITED STATES PATENTS

| Number | Name | Date |
|---|---|---|
| 797,102 | Dunton | Aug. 15, 1905 |
| 1,924,713 | Eremeeff | Aug. 29, 1933 |
| 1,941,870 | Severy | Jan. 2, 1934 |
| 1,968,498 | Mills | July 31, 1934 |
| 2,030,248 | Eremeeff | Feb. 11, 1936 |
| 2,075,802 | Davis | Apr. 6, 1937 |
| 2,080,100 | Tauschek | May 11, 1937 |
| 2,175,142 | Andres | Oct. 3, 1939 |
| 2,178,706 | Severy | Nov. 7, 1939 |
| 2,416,445 | Jensen | Feb. 25, 1947 |
| 2,452,743 | Fuschi | Nov. 2, 1948 |
| 2,468,198 | Heller | Apr. 26, 1949 |
| 2,488,482 | Swarthout et al. | Nov. 15, 1949 |
| 2,514,578 | Heller et al. | July 11, 1950 |
| 2,528,161 | Miloche | Oct. 31, 1950 |